United States Patent [19]

Muto et al.

[11] Patent Number: 4,980,060
[45] Date of Patent: Dec. 25, 1990

[54] HOLLOW FIBER MEMBRANES WITH FUSION-BONDED END PORTIONS

[75] Inventors: Yoshihiko Muto, Moriyama; Kohei Watanabe, Fuji; Koichi Yasukata, Fuji; Tomoyuki Sakurai, Fuji, all of Japan

[73] Assignee: Asahi Kasei Kogyo Kabushiki Kaisha, Osaka, Japan

[21] Appl. No.: 217,782

[22] Filed: Jul. 12, 1988

[30] Foreign Application Priority Data

Jul. 13, 1987 [JP] Japan .................... 62-174451
Jul. 13, 1987 [JP] Japan .................... 62-174453
Feb. 26, 1988 [JP] Japan .................... 63-43449

[51] Int. Cl.⁵ ................ B01D 63/02; B01D 71/06
[52] U.S. Cl. .................... 210/321.61; 210/321.8; 210/321.89; 210/321.9; 55/158
[58] Field of Search ............... 55/158, 16; 210/321.6, 210/321.78, 321.79, 321.8, 321.87, 321.88, 321.89, 321.61, 321.9

[56] References Cited

U.S. PATENT DOCUMENTS

| 3,228,876 | 1/1966 | Mahon . | |
| 3,315,740 | 4/1967 | Withers | 165/172 |
| 4,031,012 | 6/1977 | Gies | 55/158 |
| 4,605,500 | 8/1986 | Takemura et al. | 210/321.78 |
| 4,628,584 | 12/1986 | Clark et al. | 210/321.6 |
| 4,657,743 | 4/1987 | Kanno | 210/321.78 |
| 4,720,342 | 1/1988 | Takemura et al. . | |
| 4,749,551 | 6/1988 | Borgione | 210/321.78 |
| 4,781,889 | 11/1988 | Fukasawa et al. | 210/321.8 |

FOREIGN PATENT DOCUMENTS

| 0183256 | 6/1986 | European Pat. Off. . | |
| 187358 | 7/1986 | European Pat. Off. . | |
| 2915524 | 10/1980 | Fed. Rep. of Germany | 55/158 |
| 3240143 | 5/1984 | Fed. Rep. of Germany . | |
| 2556607 | 6/1985 | France . | |
| 2059802 | 4/1981 | United Kingdom . | |
| 2168981 | 7/1986 | United Kingdom . | |
| WO85/05286 | 12/1985 | World Int. Prop. O. . | |

*Primary Examiner*—Richard V. Fisher
*Assistant Examiner*—Wanda L. Millard
*Attorney, Agent, or Firm*—Finnegan, Henderson, Farabow, Garrett & Dunner

[57] ABSTRACT

A filter element comprising porous hollow fiber filter membranes arranged in a lengthwise direction and fusion-bonded together at one or both of their respective end portions to form a unified terminal block which has through-holes communicating with the hollows of the remaining unbonded portions of the membranes and having diameters substantially the same as the inner diameters of the membranes. The filter element not only is excellent in resistance to heat and chemicals, but also can realize an efficient filtration.

6 Claims, 4 Drawing Sheets

HOLLOW FIBER MEMBRANES WITH FUSION-BONDED END PORTIONS

BACKGROUND OF THE INVENTION

1. Field Of The Invention

The present invention relates to a filter element and a filter module comprising the same. More particularly, the present invention is concerned with a filter element comprising hollow fiber filter membranes which are arranged in a lengthwise direction and fusion-bonded together at one or both of their respective end portions to provide a terminal fluid-tight bonding between the filter membranes, and a filter module comprising the same. Because no adhesive is used in the filter element of the present invention for bonding the end portions of the membranes, the filter element can advantageously be used in filtration without the disadvantages which are encountered when filtration is conducted using conventional filter elements in which an adhesive of epoxy resin or urethane resin is used. The disadvantages associated with conventional filter elements occur when the adhesive resin dissolves out into the filtrate. This causes the total organic carbon (hereinafter often referred to as "TOC") in the filtrate to increase and reduce the resistance of the adhesive resin to heat and chemicals so that the fluid-tight bonding between the filter membranes is destroyed.

2. Discussion Of Related Art

Adhesives of epoxy resins or urethane resins have generally been used for bonding the end portions of hollow fiber filter membranes together to prepare a filter element (see, for example, U.S. Pat. No. 3,228,876). However, the use of an adhesive of an epoxy resin or a urethane resin in a filter element is accompanied by the following problems.

In carrying out filtration using a filter element in which an epoxy resin or a urethane resin is used as an adhesive, it is difficult to prevent the dissolution of the adhesive resin from the filter element. Such dissolution of the adhesive resin is undesirable when the filter element is used for preparing ultra pure water.

Hollow fiber filter membranes of fluoro resins which are excellent in resistance to heat and chemicals are available. However, a filter element comprising hollow fiber filter membranes of a fluoro resin having end portions bonded together by means of an adhesive of an epoxy resin or a urethane resin cannot suitably be employed for applications requiring high resistance to heat and chemicals such as, for example, purification of strong acids to be used in producing semiconductors, because the adhesive of epoxy resin or urethane resin is poor in resistance to heat and chemicals. In other words, due to the poor resistance of the adhesive to heat and chemicals, the application of the filter element is limited and, therefore, the excellent properties of the filter membranes of a fluoro resin cannot be realized.

European Patent Application Laid-Open Specification No. 0183256 discloses the use of a fluoro rubber for bonding the end portions of hollow fiber filter membranes together. However, the resistance of commercially available fluoro rubbers to chemicals is still unsatisfactory.

U.S. Pat. No. 3,315,740 discloses a method of bonding tubes together by fusion. Tubes of a thermoplastic material are gathered in a manner such that the end portions of the tubes are in a contacting parallel relationship. The end portions of the gathered tubes is placed within a sleeve having a thermoplastic internal surface and being rigid relative to the tubes. A fluid heated to a temperature at least equal to the softening point of the thermoplastic material, is introduced into the interiors of the end portions of the tubes. Then, a pressure differential is imposed across the walls of the tubes so that the pressure within the tubes is greater than the pressure on the exterior surfaces of the tubes, thereby causing the tubes to be expanded and to be fused with the surfaces of the adjacent tubes.

This method, however, cannot suitably be employed to bond together the end portions of hollow fiber filter membranes (which are porous and, as such, differ from tubes) for the following reasons.

When a heated fluid is introduced into the interior of a hollow fiber filter membrane, not only does the hollow fiber filter membrane shrink but the porous structure of the membrane is also destroyed at the interior portion thereof. As a result, the membrane's effective length for filtration is decreased, thereby rendering the membrane unsuitable for practical use.

A porous hollow fiber filter membrane has a large number of pores that contain air. If a heated liquid is used as the heated fluid and is introduced into the interior of the hollow fiber filter membrane, the air in the pores is squeezed out as the membrane shrinks, thereby causing the hollow fiber filter membrane to have an irregular shape.

Further, porous hollow fiber filter membranes are inferior to tubes in mechanical strength. Therefore, when hollow fiber filter membranes are handled in the same manner as in the above method for bonding tubes, the hollow fiber filter membranes become bent or deformed, thereby causing the porous structures of the membranes to be nonuniform.

As mentioned above, the method of bonding tubes together which is disclosed in U.S. Pat. No. 3,315,740 pertains to a technical field which is entirely different from the technical field to which the present invention belongs, i.e., the field of filter elements each comprising porous hollow fiber filter membranes.

In fact, in attempting to bond the end portions of hollow fiber filter membranes by fusion, various problems have been encountered. The term "fusion" used herein means to bring a material into a viscous state or a state where the solid phase and the liquid phase are in equilibrium.

A hollow fiber filter membrane is a porous body having a porosity of at least 30%, as opposed to a tube and, hence, by the application of heat, a hollow fiber filter membrane shrinks considerably. Therefore, simple fusion of the end portions of hollow fiber filter membranes causes the inner diameters of the end portions of the hollow fiber filter membranes to drastically decrease with great disadvantages. For example, when a hollow fiber filter membrane of an ethylene-tetrafluoroethylene copolymer resin, which has an inner diameter of 0.77 mm, an outer diameter of 1.24 mm and a porosity of 67%, is heated in an oven maintained at 285° C. for 10 seconds, removed from the oven and cooled by air to room temperature, the inner diameter of the hollow fiber filter membrane decreases drastically to 0.30 mm, which is about 39% of the inner diameter before the heat treatment. The outer diameter thereof also decreases drastically to 0.42 mm, which is about 34% of the outer diameter before the heat treatment.

A filter element comprising hollow fiber filter membranes which have undergone such decrease in the inner diameters has severe drawbacks. For example, when carrying out filtration of a liquid containing a large amount of suspended solids by means of such a filter element, the hollow portions of the hollow fiber filter membranes are often clogged with the suspended solids because the inner diameters of the hollow fiber filter membranes are small, thereby causing the filtration to be inoperative. Further, when the filter element is used for the filtration of a highly viscous liquid, because the inner diameters of the hollow fiber filter membranes are small, there is caused a large pressure loss in the lengthwise direction. This leads to a decrease in the filtration pressure in the lengthwise direction, which causes lowering in filtering ability. Therefore, the use of this filter element for such filtration operations is disadvantageous from an economical point of view.

The drastic decrease in the outer diameter of a hollow fiber filter membrane by heat treatment also causes a problem in preparing a filter element from the membranes. Such decrease in the outer diameter makes it difficult to keep the end portions of hollow fiber filter membranes in contact with each other when heating the end portions of the membranes, thereby causing difficulties in effecting bonding of the end portions by fusion.

SUMMARY OF THE INVENTION

By extensive and intensive studies, the present inventors have succeeded in developing a completely novel filter element comprising a plurality of hollow fiber filter membranes bonded at one or both end portions thereof, which is free from the drawbacks inevitably accompanying the conventional filter elements of a hollow fiber filter membrane type, such as dissolution of the resins used as adhesive.

Accordingly, it is an object of the present invention to provide a filter element of a hollow fiber filter membrane type which is excellent in resistance to heat and chemicals.

It is another object of the present invention to provide a filter module accommodating therein the filter element of the above type.

The foregoing and other objects, features and advantages will be apparent to those skilled in the art from the following detailed description and claims taken in connection with the accompanying drawings.

BRIEF DESCRIPTION OF THE DRAWINGS

In FIGS. 1 to 7, like parts or portions are designated by like numerals.

DETAILED DESCRIPTION OF THE INVENTION

In one aspect of the present invention, there is provided a filter element comprising a plurality of porous hollow fiber filter membranes of a thermoplastic resin which are substantially equal in length and arranged in a lengthwise direction.

The membranes each have a porosity of from 30 to 90%. At least one of the end portions of the membranes is fusion-bonded at least at their respective peripheries directly or through a thermoplastic resin medium to form a unified terminal block in which the end portions of the membranes are fluid-tightly bonded together in a fused fashion, leaving the remaining portions of the membranes unbonded at their respective peripheries.

The unified terminal block has through-holes communicating with the hollows of the unbonded portions of the membranes. The through-holes have diameters substantially the same as those of the hollows of the unbonded portions of the membranes which hollows communicate with the through-holes.

The hollow fiber filter membranes to be used in the filter element of the present invention are made of a thermoplastic resin. Suitable examples of thermoplastic resins include a tetrafluoroethylene-hexafluoropropylene copolymer resin (FEP), a tetrafluoroethylene-perfluoroalkylvinyl ether copolymer resin (PFA), a tetrafluoroethylene-ethylene copolymer resin (ETFE), polyethylene, polypropylene, polyamide and polysulfone. Of them, PFA, polyethylene and polysulfone are most preferred.

The hollow fiber filter membranes used in the present invention preferably have an outer diameter of 8 mm or less, more preferably 4 mm or less, a membrane thickness preferably of at least 5 $\mu$m, more preferably ranging from 30 to 1000 $\mu$m and a porosity preferably ranging from 30 to 90%, more preferably ranging from 50 to 85%.

The term "porosity" (Pr) as used herein means the porosity having its general meaning and is defined by the following formula:

$$Pr = (1 - Pb/Pa) \times 100 \, (\%)$$

wherein Pa represents the density (g/cm$^3$) of the resin used for the membrane and Pb represents the quotient obtained by dividing the weight (g) of the membrane by the volume (cm$^3$) of the membrane including the pores.

As the hollow fiber filter membranes in the present invention, there may be employed hollow fiber membranes having average pore diameters preferably in the range of 10 to 10,000 Å.

Figure 1:
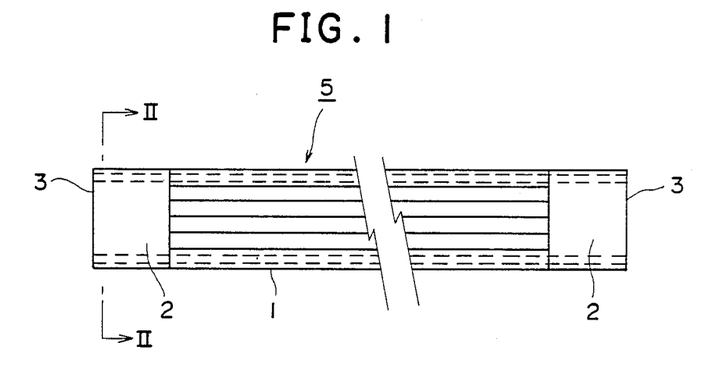
FIG. 1 is a partly cut-away diagrammatic side view of one form of filter element according to the present invention, with the hollow portions of the uppermost and lowermost membranes shown by broken lines and with the uppermost and lowermost through-holes of the unified terminal blocks also shown by broken lines.
Figure 2:
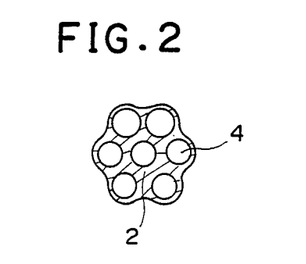
FIG. 2 is a diagrammatic explanatory view of the cross-section taken along the line II—II in FIG. 1.

Referring now to FIGS. 1 and 2, there is respectively shown a partially cut-away diagrammatic side view of one form of filter element according to the present invention and a diagrammatic cross-sectional view taken along the line II—II in FIG. 1. In FIG. 1, the hollows of the uppermost and lowermost membranes and the uppermost and lowermost through-holes of the unified terminal blocks are shown by broken lines. Filter element 5 comprises a plurality of hollow fiber filter membranes 1 which are substantially equal in length and arranged in a lengthwise direction. Both end portions of the membranes are fluid-tightly bonded together in a fused fashion to form unified terminal blocks 2, leaving the remaining portions of the membranes unbonded at their respective peripheries. In unified terminal blocks 2, the membranes are fusion-bonded at least at their respective peripheries.

Figure 6:
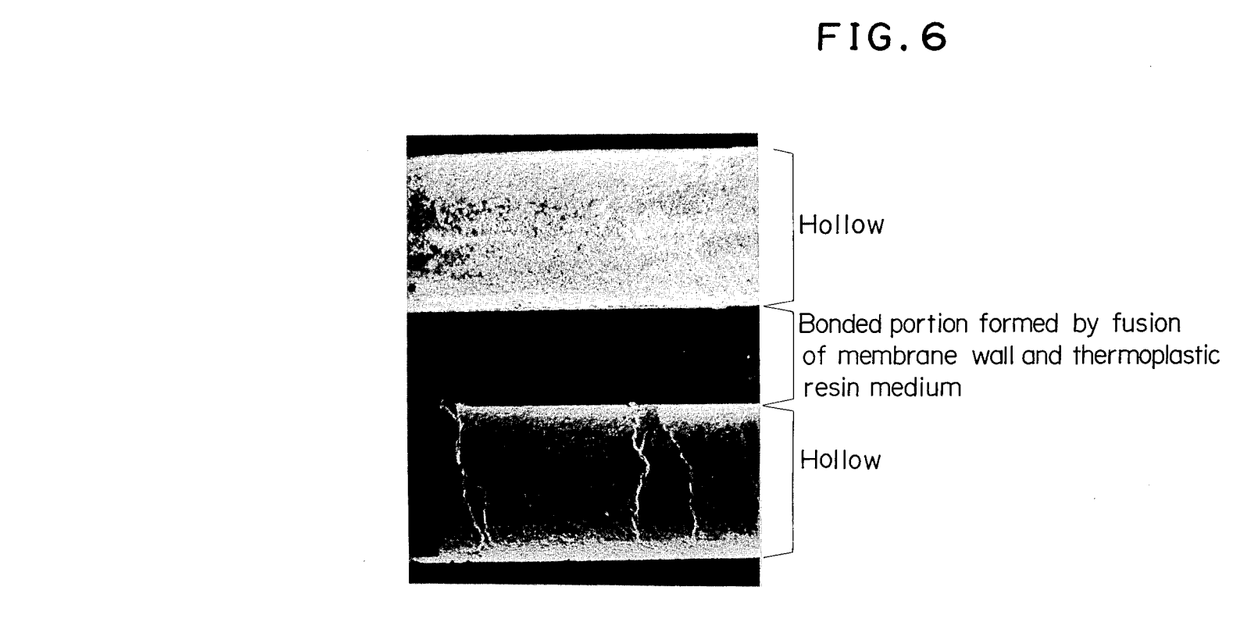
FIG. 6 is a photomicrograph (x 75) of the cross-section of a portion of the unified terminal block of the filter element obtained in Example 5 described later, in which hollow fiber filter membranes are fusion-bonded through a thermoplastic resin medium.
Figure 7:
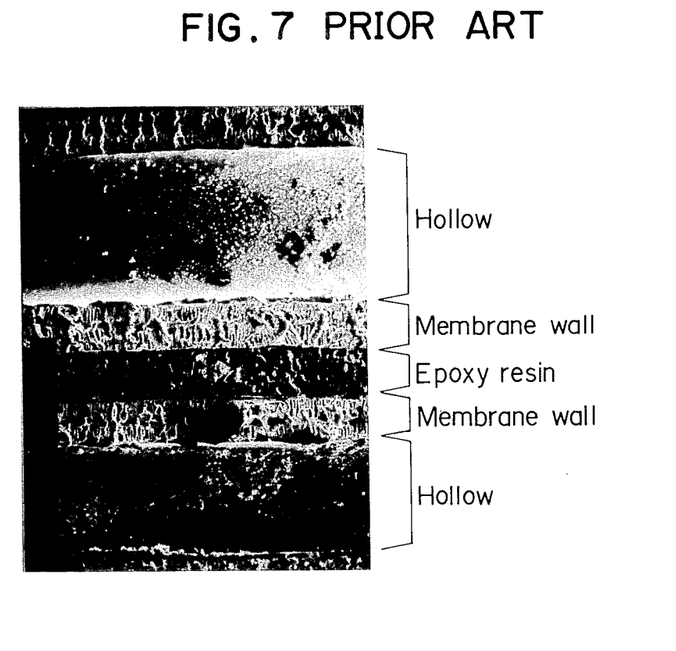
FIG. 7 is a photomicrograph (x 75) of the cross-section of a bonded portion of a conventional filter element, in which hollow fiber filter membranes are bonded together by means of an epoxy resin adhesive.

In the present invention, the end portions of bundled hollow fiber filter membranes are fused at least at their respective peripheries and then cooled to provide fusion-bonding between the membranes. In effecting the fusion of the membranes, a powder of thermoplastic resin may be interposed between the membranes. Therefore, with respect to the end portions of hollow fiber filter membranes which are fusion-bonded, the boundaries between the peripheries of the hollow fiber filter membranes or between the peripheries of the hollow fiber filter membranes and the thermoplastic resin medium are no longer present as shown in FIG. 6. Further, it is noted that in the process of fusion, the pore structures of the membranes disappear at the fused portion of the membranes and, therefore, the thickness of the membranes decreases at the fused portion. By contrast, in a conventional filter element in which hollow fiber filter membranes are bonded together by means of an adhesive, there are recognized boundaries between the peripheries of the hollow fiber filter membranes and the adhesive as shown in FIG. 7. Further, with respect to the conventional filter element, it is noted that the original pore structures of the membranes are maintained in its entirety at the bonded portion of the membranes and, therefore, there is no decrease in the thickness of the membranes at the bonded portion.

Unified terminal blocks 2 have through-holes which communicate with the hollows of the unbonded portions of the membranes, and have openings 4 at end surfaces 3 of filter element 5. The diameters of the through-holes are substantially the same as those of the hollows of the unbonded portions of the membranes which hollows communicate with the through-holes. In other words, the end portions of membranes 1 are fusion-bonded at least at their respective peripheries so that the diameter of the resultant through-hole formed in the end portion of filter element 5 by fusion of the membranes is the same as the inner diameter of the hollow fiber membrane as measured before the membrane is subjected to the fusion-bonding. The unbonded portions of hollow fiber filter membranes 1 still keep the original filtering abilities of the hollow fiber filter membranes.

In the filter element of the present invention, the through-holes of the unified terminal block generally have circular or polygonal cross-sections. It is preferred from the viewpoint of a smooth flow of a liquid through the filter element that the through-holes of the unified terminal block have circular cross-sections.

Further, in the present invention, the inner walls of the through-holes in the unified terminal block may have porous structures which are derived from the porous structures of the hollow fiber filter membranes.

The diameter of a through-hole in the unified terminal block can be determined by cutting the unified terminal block in the direction perpendicular to the lengthwise direction of the hollow fiber filter membranes to obtain a cross-section of the through-hole and measuring the diameter of the cross-section of the hole. When the cross-section of the hole is polygonal, the diameter of the cross-section is defined as the diameter of the circle inscribed in the polygon.

In unified terminal blocks 2, the end portions of membranes 1 may be fusion-bonded either directly or through a thermoplastic resin medium. When the end portions of membranes 1 are fusion-bonded through a thermoplastic resin medium, the thermoplastic resin medium is made of either a resin of the same type as that used for the hollow fiber filter membranes or a resin which is of a type different from the type of the resin used for the hollow fiber filter membranes and which is compatible with the resin used for the membranes and has a softening point preferably 0.5 to 1.5 times, more preferably 0.8 to 1.2 times, as high as the softening point (°C.) of the thermoplastic resin used for the hollow fiber filter membranes. The term "softening point" as used herein is intended to mean the melting point if the resin is of a crystallizable type and to mean the glass transition point if the resin is of a non-crystallizable type. Resins suitable for the thermoplastic resin medium include, for example, FEP (melting point: 250–295° C.), PFA (melting point: 302–310° C.), ETFE (melting point: 270° C.), polyethylene (melting point: 108–135° C.), polypropylene (melting point: 160–165° C.), polyamide (melting point: 215–255° C.) and polysulfone (glass transition point: 190° C.).

If the resin for hollow fiber filter membranes 1 is different in softening point from the resin for the thermoplastic resin medium, it is necessary that the temperature needed to melt one resin having a higher softening point be lower than the decomposition temperature of the other resin having a lower softening point. The resin for membranes 1 and the resin for the medium may preferably be of substantially the same softening point, more preferably of the same type.

Figure 3:
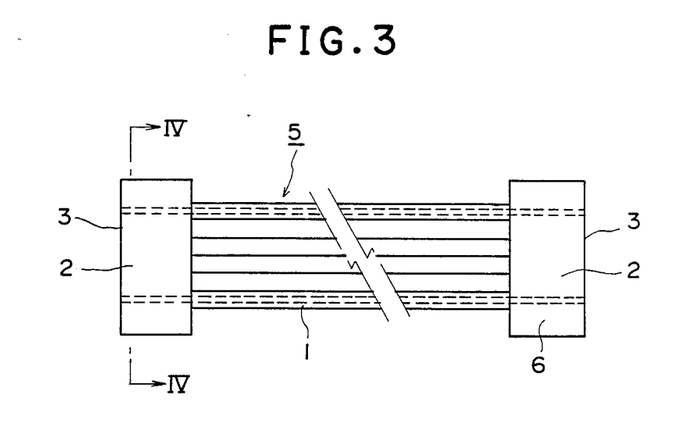
FIG. 3 is a partly cut-away diagrammatic side view of another form of filter element according to the present invention, with the hollow portions of the uppermost and lowermost membranes shown by broken lines.
Figure 4:
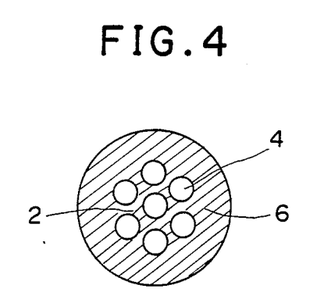
FIG. 4 is a diagrammatic explanatory view of the cross-section taken along the line IV—IV in FIG. 3.

In FIG. 3, there is shown a partly cut-away diagrammatic side view of another form of filter element according to the present invention, in which the hollows of the uppermost and lowermost membranes and the uppermost and lowermost through-holes of the unified terminal blocks are shown by broken lines. FIG. 4 shows a diagrammatic cross-sectional view taken along the line IV—IV in FIG. 3. Filter element 5 which is shown in FIGS. 3 and 4 is substantially the same as the filter element shown in FIGS. 1 and 2 except that the filter element shown in FIGS. 3 and 4 further comprises outer resin layers 6 which are present over the peripheries of unified terminal blocks 2 and fusion-bonded thereto. Outer resin layers 6 are made of a resin which is selected from the same types of thermoplastic resins as mentioned above in connection with the thermoplastic resin medium.

If the resin for hollow fiber filter membranes 1, the resin for the thermoplastic resin medium, and the resin for outer resin layers 6 have different softening points, suitable choice of a combination of resins should likewise be made so that the temperature needed to melt one resin having a highest softening point is lower than the decomposition temperatures of the remaining resins. The resin for membranes 1, the resin for the medium and the resin for layers 6 may preferably be of substantially the same softening point, more preferably of the same type.

Hereinbelow, representative methods of producing the filter element of the present invention are described.

(1) A filter element in which one or both end portions of the membranes are directly fusion-bonded can be produced, for example, by the following method:

Hollow fiber filter membranes which are substantially equal in length and contain a fine-particle inorganic filler are prepared, for example, by the process described in Example 7 of Japanese Patent Application Laid-Open Specification No. 62-106808 (reference may be made, for example, to Example 1 herein described).

The inorganic filler may preferably be a fine powder of silicic acid, calcium silicate, aluminum silicate, magnesium oxide, calcium carbonate or the like. Of them, a fine powder of silicic acid is most preferred. The fine powder may preferably has a primary particle diameter ranging from 0.005 to 0.5 μm.

One or both end portions of the thus prepared hollow fiber filter membranes are dipped in a mixture of gypsum and water to seal the end openings thereof and, after the mixture is dried, the end portions having their respective end openings sealed are dipped in a solvent capable of dissolving the filler to extract the filler from only the peripheries of the end portions of the membranes. As the solvent, for example, sodium hydroxide may be used, if the filler is powdery silicic acid. In this extraction operation, it is required to extract the filler from only the peripheries of the membrane walls of the end portions of the membrane, that is, it is required to leave the filler unextracted at portions of the membrane walls remote from the peripheries thereof. In order to meet this requirement, the extraction conditions (the concentration of the solvent, the temperature of the solvent and the extraction time) may be varied depending on the type of the membranes employed. The extraction operation may be effected efficiently by carrying out the dipping of the end portions of the membranes in the solvent while subjecting the solvent to ultrasonic treatment. The ultrasonic treatment may be carried out by means of a commercially available ultrasonic cleaner, such as MODEL B-2200 manufactured and sold by BRANSONIC CLEANING EQUIPMENT COMPANY, U.S.A. By the above-described extraction operation, there are obtained hollow fiber filter membranes having their respective end portions which contain no filler at the peripheries thereof but have the filler unextracted at portions of the membrane walls remote from the peripheries. The filler in the membranes has an effect of preventing the membranes from shrinking when the membranes are heated. Therefore, when the end portions of the above-obtained membranes are heated in the next step of this method, the inner diameter of the end portions of each membrane is not substantially decreased.

The above-obtained hollow fiber filter membranes having one or both of their respective ends sealed are subsequently arranged in a lengthwise direction to form a bundle. In case only one end portion of the membranes is sealed, the membranes are arranged so that all the sealed end portions are disposed at one end portion of the bundle. The sealed end portions of the membranes are heated at a temperature at least as high as the softening point of the resin used for the membranes. The heating temperature preferably does not exceed the softening point of the resin of the membrane by more than 100° C. The heat treatment is carried out generally for 0.2 sec to about 60 min. An appropriate measure should be taken to keep the peripheries of the end portions of the mutually adjacent membranes in contact with each other during the heat treatment. As an example of such measure, there may be mentioned winding of a non-adhesive sealing tape around the end portions of the bundle prior to the heat treatment and removing of the tape after the heat treatment. Suitable sealing tapes include NITOFLON PIPESEAL No. 95 manufactured and sold by NITTO ELECTRIC INDUSTRIAL CO., LTD., Japan. It is preferred that such a sealing tape not melt at the temperature for the heat treatment. By this heat treatment, the end portions of the membranes are directly fusion-bonded only at their respective peripheries.

After the heat treatment, the hollow fiber filter membranes are subjected to extraction of the filler, in which substantially all of the filler contained in the membranes is extracted with a solvent for the filler. The complete extraction of the filler may preferably be accomplished by repeating the extraction operation or by conducting the extraction with the temperature and the concentration of the solvent being as high as possible within the respective ranges in which the hollow fiber filter membranes are not damaged.

After the extraction of the filler, the sealed portions of the membranes are cut off to obtain a filter element comprising hollow fiber filter membranes having one or both end portions directly fusion-bonded.

(2) A filter element in which one or both end portions of the membranes are directly fusion-bonded can also be produced by the following method:

One end portion of hollow fiber filter membranes is dipped in a sealing medium consisting of about 2 parts by weight of calcium sulfate, about 4 parts by weight of calcium carbonate and about 3 parts by weight of water so that the sealing medium fills the hollows of at least the portions of the membranes which portions are to be fusion-bonded. The hollow fiber filter membranes may be either those containing no filler or those containing an inorganic filler, which are prepared in the same manner as in method (1). In the case of the latter, the filler is extracted from the peripheries of the end portions of the membranes in the same manner as in method (1).

After the sealing medium has been dried, the hollow fiber filter membranes are arranged in a lengthwise direction to form a bundle so that the sealed end portions are disposed at one end portion of the bundle. Then, the sealed end portions of the membranes are heated in substantially the same manner as in method (1) to form a unified terminal block. If desired, a unified terminal block may also be provided at the other end of the bundle in the same manner as mentioned above. Subsequently, if the hollow fiber filter membranes used are those containing an inorganic filler, the filler is completely extracted from the entire wall of each membrane in the same manner as in method (1).

Finally, the sealing medium contained in the hollows of the end portions of the membranes is extracted with 35% hydrochloric acid to obtain a filter element.

(3) A filter element in which one or both end portions of the membranes are fusion-bonded through a thermoplastic resin medium interposed between the peripheries of the end portions of the membranes can be produced, for example, by the following method:

Hollow fiber filter membranes which are substantially equal in length and containing a fine-particle inorganic filler are prepared in the same manner as described in (1) above. Then, the filler is extracted from only the peripheries of the end portions of the membranes in the same manner as described in (1) above.

After the extraction, a powdery thermoplastic resin is applied to the peripheries of the end portions of the membranes.

The powdery thermoplastic resin is a resin which may be the same as or different from the resin used for the hollow fiber filter membranes and which is compatible with the resin used for the membranes and has a softening point preferably 0.5 to 1.5 times, more preferably 0.8 to 1.2 times, as high as the softening point (°C.) of the thermoplastic resin used for the hollow fiber filter membranes. It is preferred that the powdery thermoplastic resin have the same softening point as that of the resin used for the membranes. It is most preferred that the powdery thermoplastic resin be of the same type as the resin used for the membranes.

The powdery resin can be applied to the peripheries of the end portions of the membranes, for example, by first dipping the end portions in a liquid to wet the surface of the peripheries of the end portions of the membranes and then either putting the end portions wetted with the liquid in the powdery resin or spraying or spreading the powdery resin to the wetted end portions.

As the liquid in which the end portions of the membranes are dipped, there may be employed any of inorganic compounds, organic compounds and mixtures thereof as long as they are not corrosive to the hollow fiber filter membranes. Suitable examples of such liquids include water, polyethylene glycol, polypropylene glycol, ethanol and dihydroxyphthalate. It is not preferred to use N,N-dimethylacetamide or N-methylpyrrolidone for hollow fiber filter membranes of polysulfone, because it decomposes the membranes.

In the operation for dipping the end portions in a liquid, the end portions of the membranes are maintained in the liquid for 0.2 sec or longer. The dipping operation may be carried out in such a manner that each membrane is dipped in the liquid separately or that a plurality of membranes are arranged into a bundle and dipped in the liquid collectively. When a plurality of membranes are collectively dipped in the liquid, the peripheries of the end portions of the membranes which are disposed in the inner portion of the bundle are often not readily wetted by the liquid because of the viscosity of the liquid. In such a case, the liquid may be subjected to ultrasonic treatment during the immersion of the end portions of the membranes in the liquid, thereby enabling the liquid to be attached to the peripheries of the end portions of all the membranes including those disposed in the inner portion of the bundle. In this instance, the ultrasonic treatment can be performed more effectively by increasing the temperature of the liquid so as to lower the viscosity of the liquid.

The powdery thermoplastic resin may be a mixture of powdery resins having different softening points.

The quantity of the powdery thermoplastic resin which can be attached to the periphery of the end portion of the membrane is varied depending on the outer diameter of the hollow fiber filter membrane and the type of the liquid which has been applied to the periphery of the end portion of the membrane for wetting the end portion. In general, the quantity of the powdery thermoplastic resin on the periphery of an end portion of a membrane is preferably such that the coating layer formed by the powdery thermoplastic resin is at least one-hundredth as thick as the membrane thickness, more preferably ranging from one-hundredth to twenty times as thick as the membrane thickness.

The application of the powdery thermoplastic resin to the peripheries of the end portions of the membranes can also be effected by first preparing a mixture of the same liquid as mentioned above and the powdery resin and then either dipping the end portions in the mixture or spraying or spreading the mixture onto the peripheries of the end portions.

After the attachment of the powdery resin, the hollow fiber filter membranes are arranged in a lengthwise direction to form a bundle and the sealed end portions of the membranes are heated. The heat treatment is carried out in substantially the same manner as in method (1). By this heat treatment, the end portions of the membranes are fusion-bonded at their respective peripheries through the thermoplastic resin medium resulting from the powdery thermoplastic resin.

After the heat treatment, the hollow fiber filter membranes are subjected to complete extraction of the filler in the same manner as in method (1).

After the extraction of the filler, the sealed end portions of the membranes are cut off to thereby obtain a filter element comprising hollow fiber filter membranes having one or both end portions fusion-bonded through the thermoplastic resin medium.

In this method, as well as in method (1) above, because of the effect of the filler described above in connection with method (1), the end portions of the membranes are fusion-bonded at their respective peripheries without substantial decrease in the inner diameters of the end portions of the membranes.

(4) A filter element in which one or both end portions of the membranes are fusion-bonded through a thermoplastic resin medium can also be produced by the following method:

In this method, hollow fiber filter membranes containing no inorganic filler are used as a starting material, differing from the hollow fiber filter membranes employed in methods (1) and (2).

One end portion of hollow fiber filter membranes is dipped in a mixture of gypsum and water to seal the respective end openings thereof. After the mixture has been dried, the hollow fiber filter membranes are arranged in a lengthwise direction to form a bundle in which the sealed end portions of the membranes are disposed at one end. The sealed end portions including the sealed outermost end portions are bonded together by means of an epoxy resin adhesive and the sealed outermost end portions of the membranes are cut off to expose openings. The other end portion of the hollow fiber filter membranes is also sealed in the same manner as mentioned above. Then, a non-adhesive tape, which preferably has a softening point higher than the softening point of the resin used for the hollow fiber filter membranes, is wound around the entire length of the bundle of the membranes. The interstices between the peripheries of the end portions remaining sealed are filled with a powdery thermoplastic resin by an ultrasonic treatment. As the powdery thermoplastic resin, there may be employed those resins as used in method (3).

The sealed end portions are then heated while feeding an inert gas at room temperature into the hollows of the membranes from the openings of the other end portions bonded together by the epoxy resin adhesive. By this heat treatment, the sealed end portions of the membranes are fluid-tightly bonded together in a fused fashion through a thermoplastic resin medium resulting from the powdery thermoplastic resin. The sealed outermost end portions of the membranes are cut off to expose openings.

The end portions of the membranes which are bonded together by means of an epoxy resin adhesive are cut off to obtain unbonded end portions. If desired, the thus obtained end portions are bonded together in a fused fashion in substantially the same manner as mentioned above.

Then, the non-adhesive tape wound around the entire length of the bundle is removed to obtain a filter element in which one or both end portions are fluid-tightly fusion-bonded through a thermoplastic resin medium.

(5) A filter element which comprises a unified terminal block having thereover an outer resin layer fusion-bonded thereto can be prepared, for example, by the following method:

Hollow fiber filter membranes which are substantially equal in length and contain a fine-particle inorganic filler are prepared in the same manner as in method (1). Then, one end portion of the hollow fiber filter membranes is dipped in a mixture of water and gypsum to seal the openings thereof and, after the mixture has been dried, the filler is extracted from the peripheries of the end portions of the membranes in substantially the same manner as in method (1). Then, the hollow fiber filter membranes are arranged in a lengthwise direction to form a bundle in which the sealed end portions are disposed at one end. The sealed end portion of the bundle is placed within a sleeve made of the same resin as used for the thermoplastic resin medium. Around a portion of the bundle which is outside the sleeve is wound a tape. The sleeve and the end portion of the bundle within the sleeve are heated while feeding an inert gas at room temperature into the hollows of the membranes from the openings at the other ends of the membranes.

If desired, prior to the heat treatment, the sleeve and a portion of the bundle within the sleeve may be placed in a powdery thermoplastic resin which is mentioned in method (2) while subjecting the powdery resin to ultrasonic treatment, to thereby fill the interstices between the peripheries of the end portions of the membranes and between the internal surface of the sleeve and the peripheries of the end portions of the membranes with the powdery resin.

By the above-mentioned heat treatment, the end portions of the membranes are fluid-tightly fusion-bonded together and, at the same time, the end portions of the membranes disposed in the periphery of the bundle are fluid-tightly fusion-bonded to the internal surface of the sleeve, thereby forming a unified terminal block having thereover an outer resin layer fusion-bonded thereto. After the heat treatment, the outermost end portion of the unified terminal block having thereover the resin layer fusion-bonded thereto are cut off to expose openings at the end surface of the unified terminal block. If desired, a unified terminal block having openings and having thereover an outer resin layer fusion-bonded thereto may also be provided at the other end portion of the bundle of the membranes in substantially the same manner as mentioned above.

Finally, after the tape wound around the bundle is removed, the hollow fiber filter membranes are subjected to complete extraction of the filler in substantially the same manner as in method (1) to thereby obtain a filter element comprising hollow fiber filter membranes having one or both end portions fluid-tightly fusion-bonded to form a unified thermal block having an outer resin layer fusion-bonded thereto.

(6) Alternatively, a filter element in which the unified terminal block has an outer resin layer fusion-bonded thereto may also be prepared as follows.

Hollows of one end portion of hollow filter membranes is dipped in a sealing medium consisting of about 2 parts by weight of calcium sulfate, about 4 parts by weight of calcium carbonate and about 3 parts by weight of water so that the sealing medium fills the hollows of at least the portions of the membranes which portions are to be fusion-bonded. The hollow fiber filter membranes may be either those containing no filler at least at their respective end portions or those containing an inorganic filler which are prepared in the same manner as in method (1). In the case of the latter, the filler is extracted from the peripheries of the end portions of the membranes in the same manner as in method (1).

After the sealing medium has been dried, the hollow fiber filter membranes are arranged in a lengthwise direction to form a bundle so that the sealed end portions are disposed at one end portion of the bundle. The end portion of the bundle is dipped in the liquid as mentioned in (3) above and placed in the powdery thermoplastic resin as mentioned in (3) above while subjecting the powdery resin to ultrasonic treatment, to thereby fill the interstices between the peripheries of the end portions of the membranes with the powdery resin. The end portion of the bundle is then inserted into a portable compression mold through an opening of the mold, the opening having the same diameter as that of the end portion of the bundle, and the remaining space within the mold is filled with the powdery thermoplastic resin. The portable compression mold containing the end portion of the bundle and the powdery resin are placed in an oven and heated while compressing the powdery resin to thereby form a unified terminal block having thereover an outer resin layer fusion-bonded thereto. If desired, a unified terminal block having thereover an outer resin layer may be provided also at the other end portion of the bundle of the membranes in substantially the same manner as mentioned above. Subsequently, if the hollow fiber filter membranes used are those containing an inorganic filler, the filler is completely extracted from the entire wall of each membrane in substantially the same manner as in method (1).

Finally, the sealing medium contained in the hollows of the end portions of the membranes is extracted with 35% hydrochloric acid to obtain a filter element.

By any of the above described methods (1) to (6), the end portions of the membranes are fusion bonded at their respective peripheries without substantial decrease in the inner diameters of the end portions of the membranes. Therefore, a filter element which enjoys the original filtering abilities of the hollow fiber filter membranes used can be obtained.

The through-holes of the unified terminal block of the filter element of the present invention preferably have circular cross-sections as mentioned above. The filter elements having such through-holes in the unified terminal block can be produced, for example, by methods (2) and (6) mentioned above.

In the filter element of the present invention, the inner walls of the through-holes in the unified terminal block may have porous structures which are derived from the porous structures of the hollow fiber filter membranes, as mentioned above. The filter elements having a uniform terminal block of such characteristics can be produced, for example, by one mode of the above-mentioned methods in which heat treatment is effected with respect to those hollow fiber filter membranes having their respective end portions which contain no filler at the peripheries thereof but have the filler unextracted at the portions of the membrane walls remote from the peripheries.

The filter element of the present invention is essentially characterized in that the end portions of hollow fiber filter membranes are fluid-tightly fusion-bonded without using any adhesive. Therefore, the filter element of the present invention can advantageously be used in filtration without the dangers which are encountered when filtration is conducted using conventional filter elements in which an adhesive of epoxy resin or urethane resin is used, i.e., the dangers that the adhesive resin dissolves out into the filtrate, causing the TOC in the filtrate to be increased and that the fluid-tight bonding between the filter membranes is destroyed due to the poor resistance of the adhesive resin to heat and chemicals. Particularly, the filter element of the present invention may advantageously be employed not only for preparation of ultra pure water where the increase in TOC in the water should be avoided, but also for applications in which the filter element is particularly required to be high in resistance to heat and chemicals, for example, for purifying strong acids used in preparing semiconductors.

The filter element of the present invention as described above may advantageously be constructed into a filter module.

Accordingly, in another aspect of the present invention there is provided a filter module comprising a housing and a filter element accommodated therein. The filter element comprises a plurality of porous hollow fiber filter membranes of a thermoplastic resin which are substantially equal in length and arranged in a lengthwise direction. The membranes each have a porosity of from 30 to 90%.

At least one of the end portions of the membranes is fusion-bonded at least at their respective peripheries directly or through a thermoplastic resin medium to form a unified terminal block in which the end portions of the membranes are fluid-tightly bonded together in a fused fashion, leaving the remaining portions of the membranes unbonded at their respective peripheries.

The unified terminal block has through-holes communicating with the hollows of the unbonded portions of the membranes. The through-holes have diameters substantially the same as those of the hollows of the unbonded portions of the membranes which hollows communicate with the through-holes.

The unified terminal block is fluid-tightly secured at its entire periphery to the inner wall of the housing directly or through an outer resin layer provided over and fusion-bonded to the entire periphery of the unified terminal block. Accordingly, there is provided a first chamber to which the through-holes of the unified terminal block open and a second chamber fluid-tightly separated from the first chamber and accommodating therein the unbonded portions of the membranes. The first chamber has an opening, and the second chamber has at least one opening.

Figure 5:
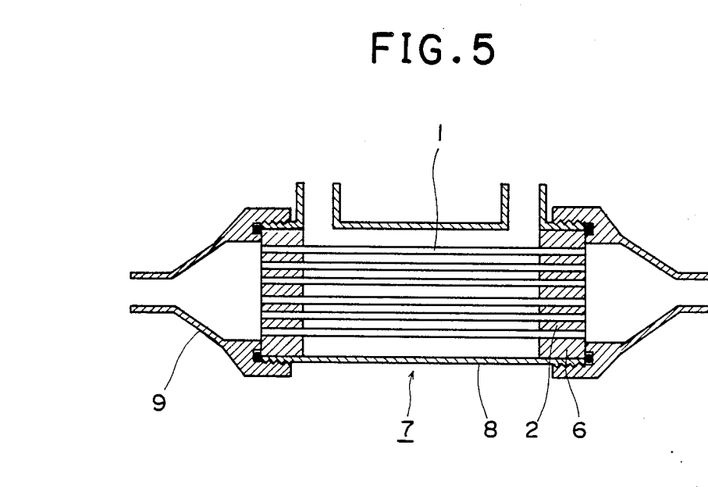
FIG. 5 is a diagrammatic cross-sectional view of one form of filter module according to the present invention.

Referring to FIG. 5, there is shown a diagrammatic cross-sectional view of one form of filter module according to the present invention. Filter module 7 consists of the filter element shown in FIG. 3 which comprises hollow fiber filter membranes 1 and unified terminal blocks 2 having thereover outer resin layers 6 fusion-bonded thereto. The filter element is accommodated in cylindrical casing 8 made of a thermoplastic resin so that both the unified terminal blocks are fluid-tightly secured at their respective peripheries to the inner wall of cylindrical casing 8 through outer resin layer 6. The connection between outer resin layer 6 and cylindrical casing 8 may be performed by fusion. Cylindrical casing 8 has two openings. Caps 9, each of which has an opening, are fluid-tightly fitted over both end portions of cylindrical casing 8 at their respective peripheries through o-rings. Caps 9 and cylindrical casing 8 cooperate with each other to form a housing. Thus, the housing is separated into a pair of first chambers in which the through-holes of the unified terminal block open and a second chamber fluid-tightly separated from the first chamber and accommodating therein the unbonded portions of hollow fiber filter membranes 1.

In operation, a liquid to be treated is supplied to one of caps 9 through the opening thereof. The liquid is pooled in the room of cap 9 and flows into the hollows of membranes 1. The liquid is then filtered through the walls of membranes 1 and flows, as a filtrate, out of the hollows of membranes 1. The filtrate is withdrawn from the openings of cylindrical casing 8. The liquid remaining unfiltered flows out of the opening of the other cap 9. Alternatively, a liquid to be treated may be supplied into cylindrical casing 8 at the openings thereof. In this case, a filtrate is withdrawn from caps 9.

In another form of filter module of the present invention, there may be employed a filter element comprising hollow fiber filter membranes, only one end portion of which is fusion-bonded together to form a single unified terminal block having thereover an outer resin layer fusion-bonded thereto. The filter element is incorporated into a cylindrical casing in substantially the same manner as shown in FIG. 5, but the resultant construction of a filter module is such that the construction shown in FIG. 5 is cut at a position intermediate the length of the cylindrical casing 8. In such an embodiment, hollow fiber filter membranes have free ends, the openings of which are sealed, for example, by fusion.

In the filter module of the present invention, the filter element accommodated therein is preferably of the type in which the end portion of the hollow fiber filter membranes is fusion-bonded through a thermoplastic resin medium.

Further, it is noted that an assembly which is prepared simply by fluid-tightly connecting suitable tubes to both end portions of a filter element of the type shown in FIG. 1 may be used in filtration. In the assembly thus constructed, the tubes connected to both end portions of the filter element can serve as chambers each having an opening. The chambers serve for pooling a liquid.

The present invention will now be described in more detail with reference to the following Examples, which should not be construed as limiting the scope of the present invention.

EXAMPLE 1

14.4% by volume of a fine powder of silicic acid (Aerosil R-972 manufactured by NIPPON AEROSIL, Japan) and 58.9% by volume of a chlorotrifluoroethylene oligomer (Difloil #100 manufactured by Daikin Industries, Ltd., Japan) were mixed in a Henschel mixer. To the resultant mixture was added 26.7% by volume of an ethylene-tetrafluoroethylene copolymer (Neoflon ETFE manufactured by Daikin Industries, Ltd., Japan) and mixed in the Henschel mixer.

The resultant mixture was extruded by a 30 mm$\phi$ diameter twin-screw extruder at 260° C. to thereby obtain pellets. The pellets were molded at 250° C. by means of a twin-screw extruder provided with a spinneret having an annular orifice, thereby obtaining an extrudate in the form of hollow fibers. The hollow fibers were immersed in 1,1,1-trichloroethane at 50° C. for 1 hour to extract the chlorotrifluoroethylene oligomer, and dried to obtain hollow fiber filter membranes. Subsequently, the thus obtained hollow fiber filter membranes were subjected to annealing at 200° C. for 1 hour to obtain annealed hollow fiber filter membranes. The annealed hollow fiber filter membranes had an inner diameter of 0.77 mm, an outer diameter of 1.24 mm, an average pore diameter of 0.21 $\mu$m, a porosity of 67% and a melting point of about 270° C.

One end portion of the above-obtained hollow fiber filter membranes was dipped in a mixture of water and gypsum and then dried, thereby sealing the openings of the end portions with the gypsum filled in each of the hollows of the end portions of 8 mm in length from the terminal of each hollow fiber filter membrane. The sealed end portions of the hollow fiber filter membranes were immersed in an aqueous 5% NaOH solution at 25° C. for 65 min while subjecting the solution to ultrasonic treatment by means of an ultrasonic cleaner (MODEL B-2200 manufactured and sold by BRANSONIC CLEANING EQUIPMENT COMPANY, U.S.A.) silicic acid powder from only the peripheries of the sealed end portions of the hollow fiber filter membranes.

Ten of the thus-obtained hollow fiber filter membranes were arranged in a lengthwise direction to form a bundle so that the sealed end portions were disposed at one end portion of the bundle, and the end portion of the bundle was bound by a tape (NITOFLON PIPE-SEAL manufactured and sold by NITTO ELECTRIC INDUSTRIAL CO., LTD., Japan). The tape-bound end portion was put in an oven adjusted to 285° C. and maintained therein for about 115 sec, and then taken out from the oven and cooled, to thereby obtain a bundle of hollow fiber filter membranes having one of their respective end portions fusion-bonded together, the end portions being 30 mm in length from the respective terminals of the membranes, thereby forming a unified terminal block.

The above-described procedure was repeated with respect to the other end portions of the hollow fiber filter membranes. Subsequently, the tape wound around the end portions of the bundle was removed and the entire bundle of 10 membranes was immersed in an aqueous 40% NaOH solution at 70° C. for 1 hour, thereby substantially removing the silicic acid powder from all portions of the membranes.

The outermost end portions of both the unified terminal blocks were cut off by a knife so that openings were exposed in the end surfaces of the unified terminal blocks, thereby obtaining a filter element comprising a plurality of hollow fiber filter membranes. The diameter of the opening in the end surfaces of the unified terminal blocks is shown in Table 1.

Both the unified terminal blocks had through-holes communicating with the openings in the respective end surfaces of the terminal blocks and with the hollows of the unbonded portions of the membranes. The through-holes had circular cross-sections, except for the peripheral through-holes having triangular cross-sections. The inner walls of the through-holes had porous structures.

EXAMPLE 2

Annealed hollow fiber filter membranes having the same characteristics as described in Example 1 were prepared in the same manner as in Example 1.

With respect to the thus obtained hollow fiber filter membranes, sealing of one end portion of the membranes and removal of the silicic acid powder from only the peripheries of the sealed end portions of the membranes were conducted in the same manner as in Example 1.

Ten of the thus-obtained hollow fiber filter membranes were arranged in a lengthwise direction to form a bundle so that the sealed end portions were disposed at one end portion of the bundle and the end portion of the bundle was inserted into a cylindrical sleeve which is made of the same material as that of the hollow fiber filter membranes and which has an inner diameter such as to closely cover the bundle. The portion of the bundle which was outside the sleeve was bound with a seal tape (manufactured by Nippon Balka Co., Japan). The sleeve and the end portion of the bundle within the sleeve were put in an oven adjusted to 285° C. and maintained therein for about 5 min while nitrogen gas at 25° C. was fed into the hollows of the membranes from their respective openings at the other unsealed ends of the membranes at a rate of from 20 ml/min to 4,000 ml/min, and then, pulled out of the oven and allowed to stand for cooling, thereby forming a unified terminal block of 30 mm in length, which block had thereover an outer resin layer fusion-bonded thereto.

The outermost end portion of the unified terminal block having thereover the resin layer was cut off by a diamond cutter, thereby exposing openings in the end surface of the unified terminal block.

The same procedure as described above was repeated with respect to the other end portions of the hollow fiber filter membranes. Then, after removing the tape wound around the bundle, the entire bundle of 10 hollow fiber filter membranes was immersed in a 40% aqueous NaOH solution at 70° C. for 1 hour, thereby substantially removing the silicic acid powder from all portions of the membranes. Thus, there was obtained a filter element having unified terminal blocks of 30 mm in length, which blocks each had thereover an outer resin layer fusion-bonded thereto, as shematically shown in FIG. 3. The diameter of the opening in the end surfaces of the unified terminal blocks is shown in Table 1.

Both the unified terminal blocks had through-holes communicating with the openings in the respective end surfaces of both the blocks and with the hollows of the unbonded portions of the membranes. The through-holes had circular cross-sections, except for the peripheral through-holes having triangular cross-sections. The inner walls of the through-holes had porous structures.

EXAMPLE 3

Annealed hollow fiber filter membranes having the same characteristics as described in Example 1 were prepared in the same manner as in Example 1.

With respect to the thus obtained hollow fiber filter membranes, sealing of one end portions of the membranes and removal of the silicic acid powder from only the peripheries of the sealed end portions of the membranes were conducted in the same manner as in Example 1.

Ten of the thus-obtained hollow fiber filter membranes were arranged in a lengthwise direction to form a bundle so that the sealed end portions were disposed at one end portion of the bundle, and the end portion of the bundle was bound by a tape (NITOFLON PIPE-SEAL manufactured and sold by NITTO ELECTRIC INDUSTRIAL CO., LTD., JAPAN). The tape-bound end portion of the bundle was dipped in water and then put into a fine powder (ASTM 100 mesh pass) of the same material as that of the hollow fiber filter filter membranes and maintained therein for 30 sec while subjecting the powder to ultrasonic treatment. Subsequently, the end portion of the bundle was put in an oven adjusted to 285° C. and maintained therein for about 270 sec, and then drawn out of the oven and allowed to stand for cooling, to thereby form a unified terminal block.

The same procedure as described above was repeated with respect to the other end portions of the hollow fiber filter membranes. Then, after removing the tape wound around the end portions of the bundle, the entire bundle was immersed in a 40% aqueous NaOH solution at 70° C. for 1 hour, thereby substantially removing the silicic acid powder from all portions of the membranes.

The outermost end portions of the unified terminal blocks were cut off by a knife, thereby exposing openings in the end surfaces of the unified terminal blocks. Thus, there was obtained a filter element as shematically shown in FIG. 1. The diameter of the opening in the end surfaces of the unified terminal blocks is shown in Table 1.

Both the unified terminal blocks had through-holes communicating with the openings in the respective end surfaces of the terminal blocks and with the hollows of the unbonded portions of the membranes. All of the through-holes had circular cross-sections. The inner walls of the through-holes had porous structures.

EXAMPLE 4

Annealed hollow fiber filter membranes having the same characteristics as described in Example 1 were prepared in the same manner as in Example 1.

With respect to the thus obtained hollow fiber filter membranes, sealing of one end portions of the fibers and removal of the silicic acid powder from only the peripheries of the sealed end portions of the membranes were conducted in the same manner as in Example 1.

Ten of the thus-obtained hollow fiber filter membranes were arranged in a lengthwise direction to form a bundle so that the sealed end portions were disposed at one end portion of the bundle and the end portion of the bundle was inserted into a cylindrical sleeve which is made of the same material as that of the hollow fiber filter membranes and which has an inner diameter such as to closely cover the bundle. The portion of the bundle which was outside the sleeve was bound with a seal tape (manufactured by Nippon Balka Co., Japan). The sleeve and the end portion of the bundle within the sleeve were dipped in water and then put into a fine powder (ASTM 100 mesh pass) of the same material as that of the hollow fiber filter membranes and maintained therein for 30 sec while subjecting the powder to ultrasonic treatment. Subsequently, the sleeve and the end portion of the bundle were put in an oven adjusted to 285° C. and maintained therein for 5 min while nitrogen gas at about 25° C. was fed into the hollows of the membranes from their respective openings at the unsealed ends of the membranes at a rate of from 20 ml/min to 4,000 ml/min, and then, pulled out of the oven and allowed to stand for cooling, thereby forming a unified terminal block of 30 mm in length which block had thereover an outer resin layer fusion-bonded thereto.

The outermost end portion of the unified terminal block having thereover an outer resin layer was cut off by a diamond cutter, thereby exposing openings in the end surface of the unified terminal block.

The same procedure as described above was repeated with respect to the other end portions of the hollow fiber filter membranes. Then, after removing the tape wound around the bundle, the entire bundle of 10 hollow fiber filter membranes was immersed in a 40% aqueous NaOH solution at 70° C. for 1 hour, thereby substantially removing the silicic acid powder from all portions of the membranes. Thus, there was obtained a filter element having unified terminal blocks of 30 mm in length, which blocks each had an outer resin layer fusion-bonded thereto, as shematically shown in FIG. 3. The diameter of the opening in the end surface of each of the unified terminal blocks is shown in Table 1.

Both the unified terminal blocks had through-holes communicating with the openings in the respective end surfaces of both the blocks and with the hollows of the unbonded portions of the membranes. The through-holes had circular cross-sections except for the peripheral through-holes having triangular cross-sections. The inner walls of the through-holes had porous structures.

EXAMPLE 5

Annealed hollow fiber filter membranes having the same characteristics as described in Example 1 were prepared in the same manner as in Example 1.

With respect to the thus obtained hollow fiber filter membranes, one end portions of them were immersed in an aqueous 25% NaOH solution at 70° C. for 6 hours, the end portions being 90 mm in length from the respective terminals of the membranes, thereby completely removing the silicic acid powder from the end portions. The end portions of the membranes were washed with water for 12 hours. Separately, about 20 g of calcium carbonate and about 8 g of calcium sulfate were kneaded with about 10 ml of water to prepare a sealant. The sealant was packed in each of the hollows of the above-treated end portions of the membranes from the opening, the end portions being 85 mm in length from the respective terminals of the membranes, thereby sealing the end portions of the membranes.

Ten of the thus obtained hollow fiber filter membranes were arranged in a lengthwise direction to form a bundle in which the sealed end portions were disposed at one end portion of the bundle and the interstices between the peripheries of the end portions of the membranes were filled with a fine powder (ASTM 100 mesh pass) of the same resin as that of the membranes, the end portions being 50 mm in length from the respective terminals of the membranes. Then, the end portion of the bundle was bound by a Teflon seal tape and the interstices between the peripheries of the end portions of the peripheral membranes of the bundle and the internal surface of the seal tape were filled with the same fine powder mentioned above, the end portions being 50 mm in length from the respective terminals of the membranes.

The end portion of the bundle was put in an oven and maintained at 295° C. for about 4 min, and then, taken out of the oven to allow it to cool, thereby forming a unified terminal block of 30 mm in length. Then, the seal tape was removed and the outermost end portion of the unified terminal block was cut off, the outermost end portions being 15 mm in length from the respective terminals of the membranes. The thus obtained end portion of the bundle was immersed in an aqueous 35% HCl solution at 35° C. for 2 days to remove the sealing medium, thereby exposing openings in the end surface of the unified terminal block.

The same procedure as described above was repeated with respect to the other end portion of the bundle. Subsequently, in the same manner as in Example 1, the silicic acid powder was substantially removed from all portions of the membranes, thereby obtaining a filter element comprising 10 hollow fiber filter membranes.

With respect to the filter element, all the through-holes in the unified terminal blocks had circular cross-sections, and no portion of the unified terminal blocks had a porous structure.

With respect to the filter element, as is apparent from FIG. 6, there are no longer recognized boundaries between the membrane walls and the thermoplastic resin medium. FIG. 7 is a photomicrograph (x 75) of the cross-section of a bonded portion of a conventional filter element, in which hollow fiber filter membranes are bonded together by means of an epoxy resin adhesive. With respect to the bonded portion of the conventional filter element, as is apparent from FIG. 7, there are recognized boundaries between the membrane walls and the epoxy resin adhesive in contrast to the filter element of the present invention.

EXAMPLE 6

Using the filter element obtained in Example 4, a filter module was prepared as follows.

The filter element was inserted in a cylindrical casing made of the same resin as that of the hollow fiber filter membrane of the filter element and had the same structure as that of casing 8 shown in FIG. 5. A gap of 0.4 mm was provided between the peripheral surface of the outer resin layer and the inner wall surface of the casing when the filter element was positioned in the casing so as to form a gap therebetween along the entire periphery of the outer resin layer. The gap between the peripheral surface of the outer resin layer and the inner wall surface of the casing was filled with a fine powder (ASTM 100 mesh pass) of the same resin as those of the hollow fiber membrane of filter element and the casing, and portions of the resultant assembly in which the gap is filled with the resin were put in an oven and maintained at 285° C. for about 5 min, and then allowed to stand for cooling.

Caps having the same structure as those of caps 9 in FIG. 5 were respectively fitted over both end portions of the casing through O-rings, thereby obtaining a hollow fiber filter membrane type filter module as shematically shown in FIG. 5.

The obtained filter module is excellent in resistance to heat and chemicals.

COMPARATIVE EXAMPLE

Annealed hollow fiber filter membranes having the same characteristics as described in Example 1 were prepared in the same manner as in Example 1. Then, the silicic acid powder was removed from all portions of the membranes. Ten of the resultant hollow fiber filter membranes were bonded together by means of an epoxy resin as follows. The membranes were arranged in a lengthwise direction to form a bundle and the bundle was placed on end on a laboratory dish. An epoxy resin adhesive was poured onto the dish and allowed to stand for curing. After the adhesive was cured, the outermost end portion of the bundle was cut off to expose openings of the hollow fiber filter membranes. The other end of the bundle was treated in substantially the same manner as mentioned above. For more detail of the method of bonding by means of an epoxy resin, reference may be made, for example, to Example 1 of Japanese Patent Application Publication No. 53-43390/1978. Thus, there was obtained a filter element.

The diameter of the opening in the end surface of each of the unified terminal blocks of the filter element is shown in Table 1.

TABLE 1

|  | Diameter of the openings in the end surface of the unified terminal block of the filter element |
|---|---|
| Example 1 | 0.70 mm |
| Example 2 | 0.72 mm |
| Example 3 | 0.71 mm |
| Example 4 | 0.73 mm |
| Comparative Example | 0.77 mm |

EXAMPLE 7

The filter elements obtained in Examples 1 to 4 and the Comparative Example were each separately immersed in a 35% hydrogen peroxide solution. Each solution was replaced with a fresh solution every 24 hours and the solution replaced was subjected to measurement of the TOC content using TOC-500 (manufactured and sold by Shimadzu Seisakusho Ltd., Japan). The results are shown in Table 2.

TABLE 2

|  | Content of TOC (ppm) | | |
|---|---|---|---|
|  | 1st solution | 3rd solution | 5th solution |
| Example 1 | 1.2 | 0.4 | 0.1 |
| Example 2 | 1.5 | 0.6 | 0.1 |
| Example 3 | 1.2 | 0.4 | 0.1 |
| Example 4 | 1.4 | 0.6 | 0.1 |
| Comparative Example | 12.3 | 3.4 | 1.3 |

Note:
The values in Table 2 were obtained by deducting the TOC value of the 35% hydrogen peroxide from the measured TOC values.

What is claimed is:

1. A filter element comprising a plurality of porous hollow fiber filter membranes of a thermoplastic resin, each of which membranes has two end portions and hollows passing therebetween and which are substantially equal in length and arranged in a lengthwise direction, said membranes each having a porosity of from 30 to 90%, at least one of said end portions of each of said membranes being fusion-bonded at least at its periphery through a thermoplastic resin medium to form a unified terminal block in which the end portions of said membranes are fluid-tightly bonded together in a fused fashion, said membranes each being unbonded at portions other than the fusion-bonded end portions, said unified terminal block having through-holes communicating with the hollows of the unbonded portions of said membranes, said through-holes having diameters substantially the same as those of the hollows of the unbonded portions of said membranes which hollows communicate with said through-holes.

2. The filter element according to claim 1, wherein said thermoplastic resin medium being compatible with the resin of the membranes and having a softening point 0.5 to 1.5 times as high as the softening point (°C.) of the resin of the membranes.

3. A filter module comprising a housing having an inner wall which defines an internal spacing of the housing and a filter element accommodated in the internal spacing of the housing, said filter element comprising a plurality of porous hollow fiber filter membranes of a thermoplastic resin, each of which membranes has two end portions and hollows passing therebetween and which are substantially equal in length and arranged in a lengthwise direction, said membranes each having a porosity of from 30 to 90%, at least one of said end portions of each of said membranes being fusion-bonded at least at its periphery through a thermoplastic resin medium to form a unified terminal block in which the end portions of said membranes are fluid-tightly bonded together in a fused fashion, said membranes each being unbonded at portions other than the fusion-bonded end portions, said unified terminal block having through-holes communicating with the hollows of the unbonded portions of said membranes, said through-holes having diameters substantially the same as those of the hollows of the unbonded portions of said membranes which hollows communicate with said through-holes, said unified terminal block being fluid-tightly secured at its entire periphery to the inner wall of said housing, thereby providing a first chamber to which said through-holes of the unified terminal block open and a second chamber fluid-tightly separated from said first chamber and accommodating therein the unbonded portions of said membranes, said first chamber having an opening, and said second chamber having at least one opening.

4. The filter module according to claim 3, wherein said thermoplastic resin medium being compatible with the resin of the membranes and having a softening point 0.5 to 1.5 times as high as the softening point (°C.) of the resin of the membranes.

5. A filter element comprising a plurality of porous hollow fiber filter membranes of a thermoplastic resin, each of which membranes has two end portions and hollows passing therebetween and which are substantially equal in length and arranged in a lengthwise direction, said membranes each having a porosity of from 30 to 90%, at least one of said end portions of each of said membranes being fusion-bonded at least at its periphery to form a unified terminal block in which the end portions of said membranes are fluid-tightly bonded together in a fused fashion, said unified terminal block having an outer resin layer formed over and fusion-bonded to the entire periphery of said unified terminal block, said outer resin layer being made of a thermoplastic resin being compatible with the resin of the membranes and having a softening point 0.5 to 1.5 times as high as the softening point (°C.) of the resin of the membranes, said membranes each being unbonded at portions other than the fusion-bonded end portions, said unified terminal block having through-holes communicating with the hollows of the unbonded portions of said membranes, said through-holes having diameters substantially the same as those of the hollows of the unbonded portions of said membranes which hollows communicate with said through-holes.

6. A filter module comprising a housing having an inner wall which defines an internal spacing of the housing and a filter element accommodated in the internal spacing of the housing, said filter element comprising a plurality of porous hollow fiber filter membranes of a thermoplastic resin, each of which membranes has two end portions and hollows passing therebetween and which are substantially equal in length and arranged in a lengthwise direction, said membranes each having a porosity of from 30 to 90%, at least one of said end portions of each of said membranes being fusion-bonded at least at its periphery to form a unified terminal block in which the end portions of said membranes are fluid-tightly bonded together in a fused fashion, said membranes each being unbonded at portions other than the fusion-bonded end portions, said unified terminal block having through-holes communicating with the hollows of the unbonded portions of said membranes, said through-holes having diameters substantially the same as those of the hollows of the unbonded portions of said membranes which hollows communicate with said through-holes, said unified terminal block being fluid-tightly secured at its entire periphery to the inner wall of said housing through an outer resin layer provided over and fusion-bonded to the entire periphery of said unified terminal block, said outer resin layer being made of a thermoplastic resin being compatible with the resin of the membranes and having a softening point 0.5 to 1.5 times as high as the softening point (°C.) of the resin of the membranes, thereby providing a first chamber to which said through-holes of the unified terminal block open and a second chamber fluid-tightly separated from said first chamber and accommodating therein the unbonded portions of said membranes, said first chamber having an opening, and said second chamber having at least one opening.

* * * * *